US008649906B2

(12) United States Patent
Bischoff et al.

(10) Patent No.: US 8,649,906 B2
(45) Date of Patent: Feb. 11, 2014

(54) ROBOT AND METHOD FOR MONITORING THE TORQUE ON SUCH A ROBOT

(75) Inventors: Rainer Bischoff, Augsburg (DE); Eugen Heinze, Augsburg (DE); Ralf Koeppe, Augsburg (DE); Johannes Kurth, Augsburg (DE); Gunter Schreiber, Friedberg (DE); Uwe Zimmermann, Augsburg (DE)

(73) Assignee: KUKA Laboratories GmbH, Augsburg (DE)

( * ) Notice: Subject to any disclaimer, the term of this patent is extended or adjusted under 35 U.S.C. 154(b) by 246 days.

(21) Appl. No.: 12/809,837

(22) PCT Filed: Dec. 11, 2008

(86) PCT No.: PCT/EP2008/010499
§ 371 (c)(1),
(2), (4) Date: Jun. 21, 2010

(87) PCT Pub. No.: WO2009/083111
PCT Pub. Date: Jul. 9, 2009

(65) Prior Publication Data
US 2010/0324733 A1    Dec. 23, 2010

(30) Foreign Application Priority Data

Dec. 28, 2007    (DE) .......................... 10 2007 063 099

(51) Int. Cl.
*B25J 9/04*    (2006.01)
(52) U.S. Cl.
USPC ............................. 700/258; 700/261; 901/34
(58) Field of Classification Search
USPC ............................................. 701/3, 9, 14, 16
See application file for complete search history.

(56) References Cited

U.S. PATENT DOCUMENTS 4,763,531 A * 8/1988 Dietrich et al. .......... 73/862.044
5,186,695 A * 2/1993 Mangseth et al. ................ 482/6
(Continued)

FOREIGN PATENT DOCUMENTS

DE    10 2004 030 144 A1    1/2006
DE    10 2006 022 889 A1    11/2007
(Continued)

OTHER PUBLICATIONS

Helmick et al. A Comparison of Force Sensing Techniques for Planetary Manipulation. IEEEAC paper #14233, Version 5, Updated Oct. 27, 2005.*

(Continued)

*Primary Examiner* — Helal A Algahaim
*Assistant Examiner* — Charles J Han
(74) *Attorney, Agent, or Firm* — Wood, Herron & Evans, LLP (57) ABSTRACT

In order to increase the safety of a robot that may come into contact with other robots, objects or humans, the invention provides that said robot comprises at least two joints and parts that are moveable in relation to each other via at least one joint. At least one sensor (31) is arranged on at least one moveable part (3, 4, 5', 6, 7), detecting torque. Sensor components (21', 22.1, 22.2) of the sensor (31) are designed for the redundant detection of a torque, or for the redundant detection of a torque of at least two sensors (31) are provided, and redundant evaluation units are provided for the redundant evaluation. In order to increase safety, the invention further provides a method for monitoring torque on a robot of said kind, wherein at least a torque on at least one movable part (3, 4, 5', 6, 7) is redundantly detected and redundantly evaluated on at least one moveable part (3, 4, 5', 6, 7) by means of two sensor components of a sensor (31) or by means of two sensors (31).

23 Claims, 8 Drawing Sheets

(56) References Cited

U.S. PATENT DOCUMENTS

| | | | | |
|---|---|---|---|---|
| 6,202,028 B1* | 3/2001 | Crane et al. | | 702/43 |
| 6,313,427 B1* | 11/2001 | Suita | | 219/109 |
| 7,249,526 B2* | 7/2007 | Hsieh | | 73/862.21 |
| 7,395,606 B2* | 7/2008 | Crampton | | 33/503 |
| 7,562,261 B2* | 7/2009 | Meyer-Grafe et al. | | 714/48 |
| 7,562,589 B2* | 7/2009 | Anjanappa et al. | | 73/862.23 |
| 7,694,588 B2* | 4/2010 | Stehlin et al. | | 73/862.322 |
| 7,770,461 B2* | 8/2010 | Perriard et al. | | 73/767 |
| 7,870,808 B2* | 1/2011 | Asai | | 74/490.06 |
| 7,911,333 B2* | 3/2011 | Bussert et al. | | 340/507 |
| 7,923,998 B2* | 4/2011 | Hammerschmidt | | 324/252 |
| 2004/0045375 A1* | 3/2004 | Fite et al. | | 73/862.338 |
| 2004/0199837 A1* | 10/2004 | Meyer-Grafe et al. | | 714/712 |
| 2004/0236469 A1* | 11/2004 | Moridaira et al. | | 700/245 |
| 2005/0092143 A1* | 5/2005 | Lehnert et al. | | 81/469 |
| 2005/0154295 A1* | 7/2005 | Quistgaard et al. | | 600/424 |
| 2005/0166413 A1* | 8/2005 | Crampton | | 33/503 |
| 2006/0259195 A1* | 11/2006 | Eliuk et al. | | 700/245 |
| 2007/0021738 A1* | 1/2007 | Hasser et al. | | 606/1 |
| 2007/0067678 A1* | 3/2007 | Hosek et al. | | 714/25 |
| 2007/0216427 A1* | 9/2007 | Barton | | 324/719 |
| 2007/0265731 A1* | 11/2007 | Merk et al. | | 700/245 |
| 2009/0072986 A1* | 3/2009 | Bussert et al. | | 340/679 |
| 2010/0324733 A1* | 12/2010 | Bischoff et al. | | 700/258 |

FOREIGN PATENT DOCUMENTS

| | | |
|---|---|---|
| EP | 1 367 314 A2 | 12/2003 |
| WO | 2007/131712 A1 | 11/2007 |

OTHER PUBLICATIONS

Peters, et al. Uncovering Manifold Structures in Robonaut's Sensory-Data State Space. 2005, IEEE.*

European Patent Office; Search Report in International Patent Application No. PCT/EP2008/010499 dated Apr. 21, 2009; 6 pages.

Helmick et al.; "A Comparison of Force Sensing Techniques for Planetary Manipulation"; 2005 IEEE; 14 pages.

Peters et al.; "Uncovering Manifold Structures in Robonaut's Sensory-Data State Space"; 2005 IEEE; 6 pages.

* cited by examiner

ROBOT AND METHOD FOR MONITORING THE TORQUE ON SUCH A ROBOT

The invention relates to a robot having at least two joints and parts that are movable relative to each other via at least one joint in each case, as well as a method for monitoring torques on a robot that has at least two joints and parts that are movable relative to each other via at least one joint in each case.

The object of the invention is a robot generally according to EN ISO 1018-1 section 3.18 or EN ISO 8373 section 2.6 in the form of an automatically controlled, freely programmable multipurpose manipulator that is programmable in three or more axes and may be situated either in a fixed location or movably, without the range of application being restricted to automation technology, and in particular an articulated robot according to EN ISO 1018-1 section 3.15.5.

The strategy until now for making a robot safe has consisted in surrounding it by a fence and thereby preventing contact between humans and robots. In order to restrict the operating range or working space of the robot using reliable technology, its axes are limited by mechanical limit switches. If the robot turns so far that it reaches such a boundary, it is shut down.

There is an effort to make robots cooperate with each other and with humans in greater measure, and accordingly in the latter case a human is to share a working space with a robot without a protective fence, for example in order to carry out a common task. Safety plays a crucial role in such applications. The robot should not represent any danger for the human. One possibility for making the robot safe consists in limiting its power, or more generally, the kinetic energy. Detection of a collision and a suitable reaction thereto can also result in greater safety of the robot. So it has already been proposed to provide or encase robot parts with external sensors, in particular in diverse form by means of tactile and capacitive sensors.

The underlying object of the invention is to create a robot that can cooperate safely with other entities, in particular humans. The object of the invention is also to specify a method for safe operation of a robot.

The named problem is solved according to the invention with a robot of the type named at the beginning by situating at least one torque-detecting sensor on at least one movable part, by designing sensor components of the sensor for redundant detection of a torque or by providing at least two sensors for redundant detection of a torque, and by providing redundant evaluation units for redundant evaluation.

To solve the named problem, a method conforming to the genre provides that at least one torque on at least one movable part is redundantly detected and redundantly evaluated by means of at least two sensor components of a sensor or by means of two sensors.

The readings can be taken either directly or indirectly. The redundant design of the device according to the invention in accordance with the method according to the invention is such that they satisfy requirements SIL 2 and SIL 3 according to DIN standard EN 61508 and performance levels PL d and Pl e of DIN EN ISO 13849-1:2006.

Because according to the invention a robot having at least two sensors is designed for duplicate detection of one and the same torque as the measured variable, or one sensor has at least two sensor components for detecting one and the same torque as the measured variable, the condition is fulfilled so that in addition the correct functioning of the sensors or sensor components can be monitored by only one evaluation unit, and otherwise the entire further processing of the readings of the variable "torque" measured by the sensors.

Thus the invention comprises redundant and preferably diverse measurement of one and the same torque as the measured variable in each case.

According to one design of the invention, in order to increase safety it can be provided that the sensors in particular are designed differently, whether such torque sensors, using the same measuring principle, come from different manufacturers, or whether they are based on different measuring principles, for example optoelectronic sensors or sensors that monitor the motor current. A preferred design provides that a sensor has at least one strain gauge as a sensor component, since torques can be detected in a simple manner with such elements.

At the same time, preferred refinements of the invention provide that sensor components are connected as at least two measuring bridges, where in particular one measuring plate is a full bridge, in particular a Wheatstone turning bridge, and/or at least one bridge is a half bridge.

One preferred design is characterized by a monitoring device for monitoring a supply voltage at least one sensor.

This makes particularly good sense if sensors in the form of a half bridge are employed with a strain gauge. When the supply voltage deviates from a desired value, the robot can be shut off as a precaution. Alternatively, the reading from the torque sensor can be converted depending on the supply voltage.

The supply voltage of the measuring bridges can be different, in order to generate diversity. For example, sensors can be arranged so that their effects are in opposition. The sum of the two signals then remains constant.

For example, one signal may correspond to a sine function and the other to a cosine function, or in general there may be a phase shift between them. With regard to diversity, the signals may also have different frequencies and/or amplitudes. Signal filtration is performed before an analog-digital conversion.

The invention also provides a system of temperature monitoring, which monitors that the temperature falls within a predefined range and shuts the robot off if the temperature moves outside that range. The current temperature is taken into account when evaluating the torque sensors.

One concrete refinement of the idea of the invention is characterized by at least one comparison device for comparing the measured values of the same torque detected by at least two sensor components. Such a comparison device is preferably close to the sensor, i.e., situated in immediate proximity to the sensors on the manipulator.

In addition or alternatively, in addition to monitoring torque limits, there can also be provision for measured values to be compared with values that result from a model for the particular situation. This enables plausibility analyses to be performed to detect sensor errors.

Moreover, there can be provision for the robot to be moved to reference positions and/or for reference movements to be carried out, and for the functionality of sensors to be checked during these actions.

To respond to detection of an error in the sensor and processing chain, the invention provides for a device for shutting off the robot or for initiating a safe condition, if measurements of the same torque detected by at least two sensor components or sensors differ from each other by more than a predefined tolerance range.

The measured values are processed by suitable computing units, which may be microprocessors or microcontrollers, but also digital signal processors or field programmable gate arrays. Since the devices for processing the measured values according to the invention normally have two channels and are thus of redundant construction, a preferred design provides that the forenamed computing unit be of diverse design; that is, it may have microprocessors or controllers that in fact come from one manufacturer but not from the same series, but preferably for example microprocessors or controllers from different manufacturers in the different branches.

While it can always be provided for data transmission that the transmission of data is performed with a checksum, a check digit, a preferred design of the invention further provides that measured values be transmitted in analog or digital form to a computing unit via at least two channels.

Inputs that receive signals can be checked by short circuit tests and/or two-channel tests.

Finally, it also falls within the scope of the invention that the software employed in the simultaneously operating computing units is of diverse design, i.e., that it was at least compiled via different compilers. If one program was created for both computers, it must be checked according to the four-eye principle; but preferably programs are employed that were developed independently of each other. To realize reliable outputs from the computing units, signal return and test pulses are provided.

The entire processing of measured values takes place in real time. This implies that the robot is shut down, or that a suitable countermeasure in initiated in good time, before a dangerous situation for a human develops. But the robot cannot be shut down until a dangerous situation or improper performance has been detected. The system needs time to recognize a dangerous situation and initiate an appropriate response. The length of time that a danger or a torque may be allowed to operate uncontrolled determines the time in which a robot must be shut down or a danger must be eliminated. For example, if a malfunction has occurred and energy is being supplied uncontrolled to a robot, the robot can build up energy until an appropriate response is initiated. The time before an appropriate response must be initiated depends upon how quickly energy can be supplied to a system, and what maximum value is acceptable.

Additional benefits and features of the invention derive from the claims from the description below, in which exemplary embodiments of the invention are explained in detail with reference to the drawings. The figures show the following:

Figure 1:
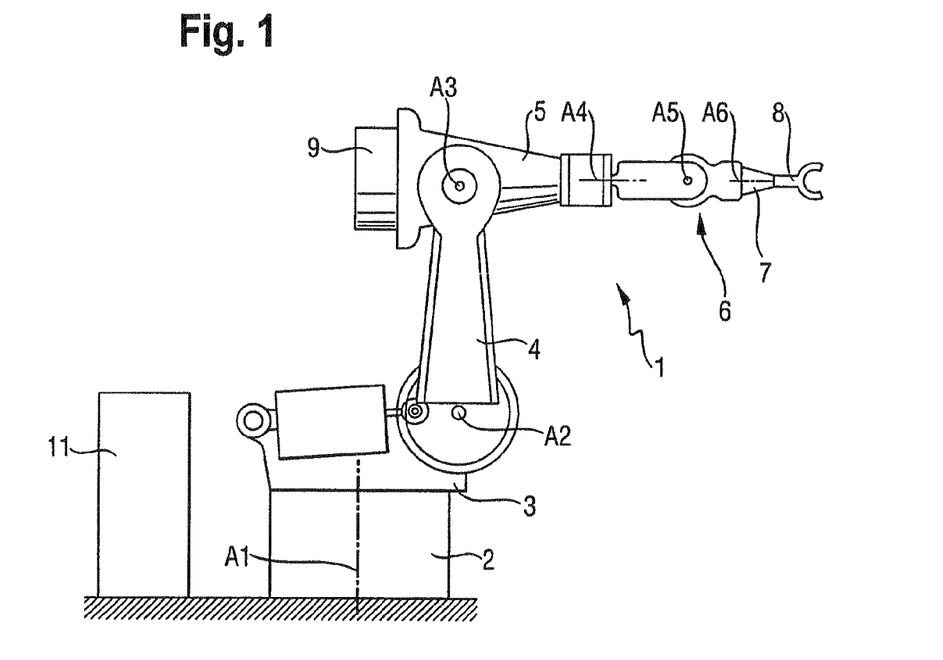
FIG. 1 a schematic depiction of a robot according to the invention.

A robot in the form of an articulated robot, depicted in FIG. 1, has an automatically controlled, freely programmable multi-purpose manipulator 1 which is programmable in three or more axes, as well as a control device no. 11, possibly including a manual programming device and communication interfaces (according to EN ISO 10218-1 section 3.18 or EN ISO 8373 section 2.6), with the utilization not being limited to automation technology.

The robot, more precisely the automatically controlled, freely programmable multi-purpose manipulator 1, has a fixed platform or fixed base 2, which supports a carousel 3 that is rotatable around a vertical A1 axis. A robot arm has a rocker arm or upper arm 4 that is linked to carousel 3 so that it can pivot around a horizontal A2 axis. Upper arm 4 supports a lower arm 5, also pivotable around a horizontal A3 axis. Attached to lower arm 5 is a robot hand 6 which is constructed in three parts, with each of the parts rotatable around an axis A4, A5 or A6. The axes preferably intersect at the so-called wrist point on axis A5. The free end of hand part 7 (rotatable around the A6 axis) is equipped with a tool 8.

The parts of hand 6 are moved by three motors 9. The motion of the other robot parts 3, 4, 5 around axes A1, A2 and A3 is effected by unshown drive motors, via gear sets. These gear sets are provided with torque sensors, for example in the form of optical torque sensors corresponding for example to EP 1 291 616 A2 or else in the form of or having strain gauges.

Figure 2A:
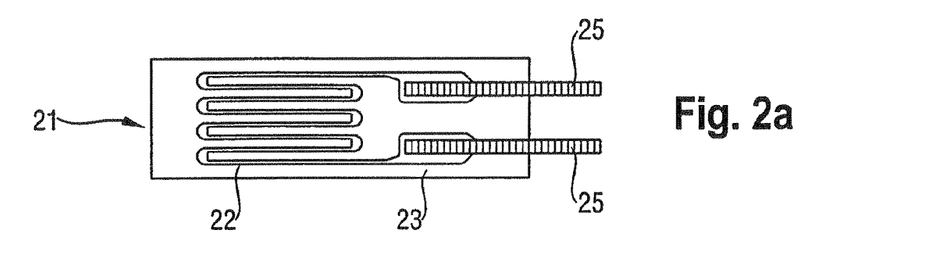
FIGS. 2a, b a top view of a strain gauge employable according to the invention for monitoring torque (FIG. 2a) and its placement on a component (FIG. 2b)
Figure 2B:
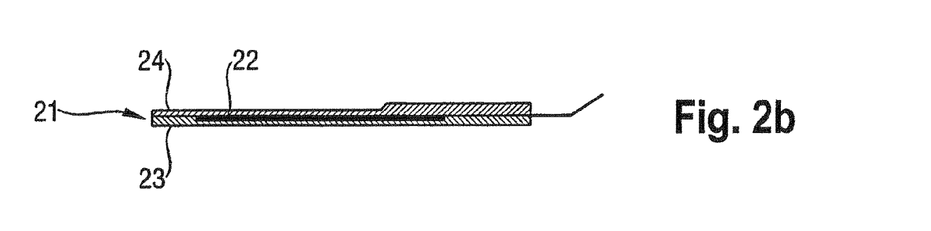

It is essential in the preferred depicted embodiment that every single occurring torque is detected twice, either by two components of one sensor, such as two strain gauges forming one sensor (possibly together with other resistances) or else by two sensors that detect the same torque, where these are then differing sensors, i.e., sensors that work according to different measuring principles, such as on the one hand a sensor that works on the basis of strain gauges and on the other hand an optoelectronic sensor, so that the corresponding torque is detected diversely. FIGS. 2a and 2b show by way of example a strain gauge 21, wherein a meandering-routed measuring resistor 22 is situated on an electrically insulating substrate 23 and under an electrically insulating cover 24, preferably of the same material, for example using thick-film technology, printing it on the substrate or the like.

Measuring resistor 22 is provided with electrical connections 25, through which it is supplied with electricity and through which the drop in the measurement voltage at measuring resistor 22 can be picked up. A mechanical deformation results in a change in resistance and thus a change in the voltage drop over resistor 22, whereby conclusions can be drawn about the cause of the deformation, in the present case the action of torques.

Figure 3:
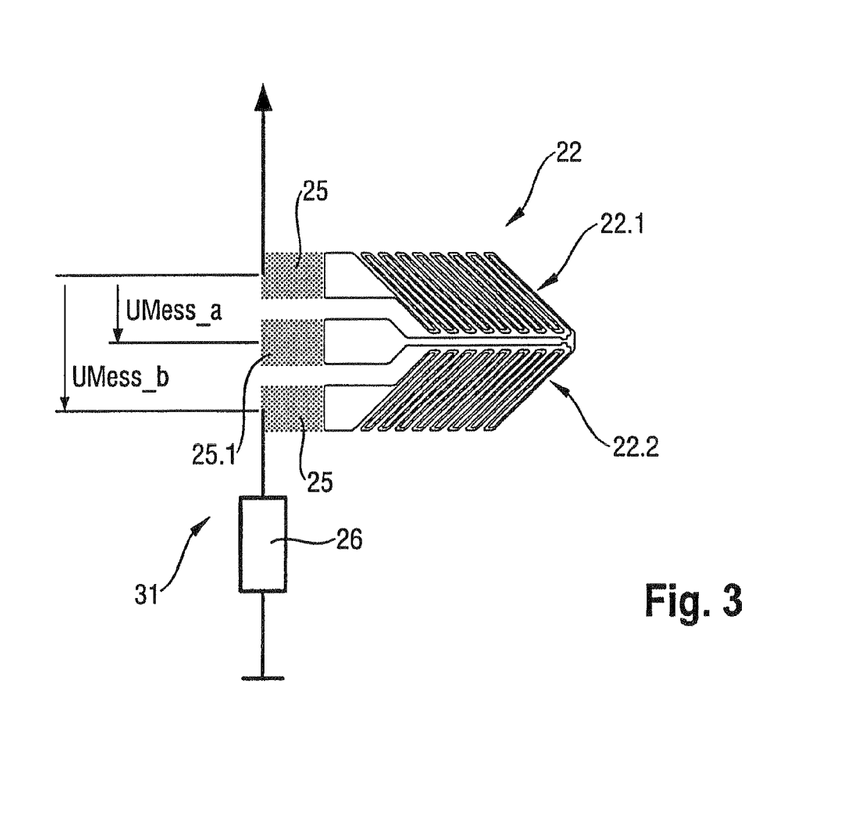
FIG. 3 a different strain gauge with three takeoff points, integrated into a half bridge.

Strain gauge 21 of FIG. 3 is double-meandering, there being a center tap with an additional electrical connection 25.1 between the two meandering sections 22.1 and 22.2. The entire measuring resistor or strain gauge 22 is connected in series with a constant ohmic resistance 26, forming a half bridge, and voltages can be picked up over the entire resistor, using the two connections 25, or else between one of the connections 25 and the center tap 25.1.

Figure 4A:
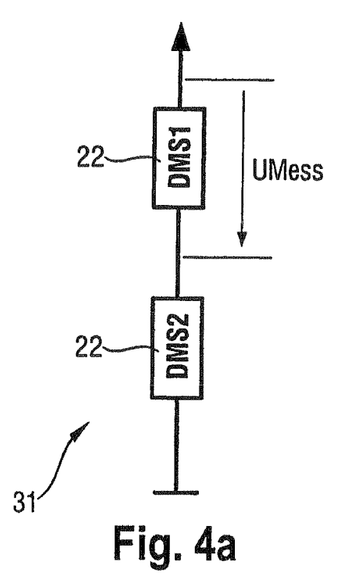
FIGS. 4a, b a sensor in the form of a half bridge with two strain gauges (FIG. 4a), and a placement on a component (FIG. 4b)
Figure 4B:
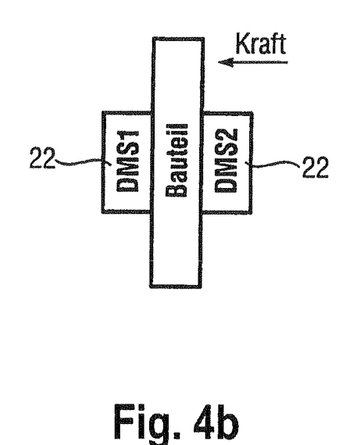

FIGS. 4a, 4b show a half bridge with two strain gauges, for example such as those in FIGS. 2a, 2b, connected in series. FIG. 4b illustrates how such strain gauges 22 which form a half bridge are placed on both sides of a component in such a way that their effects complement each other.

Figure 5:
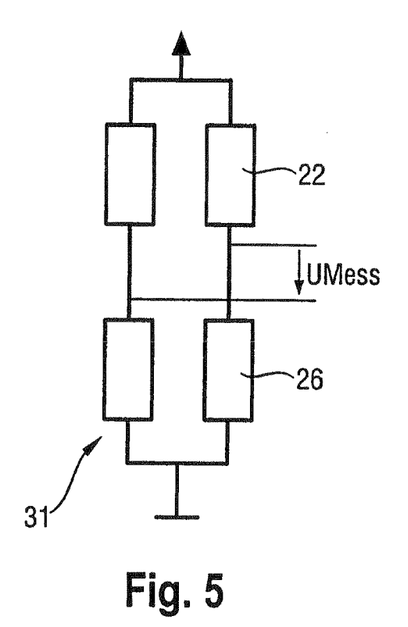
FIG. 5 a sensor in the form of a full bridge.

Finally, FIG. 5 shows a sensor in the form of a full bridge, with at least one of the four depicted resistors being constructed as a strain gauge, preferably more than one, while at least one other one is a fixed ohmic resistance 26.

Figure 6:
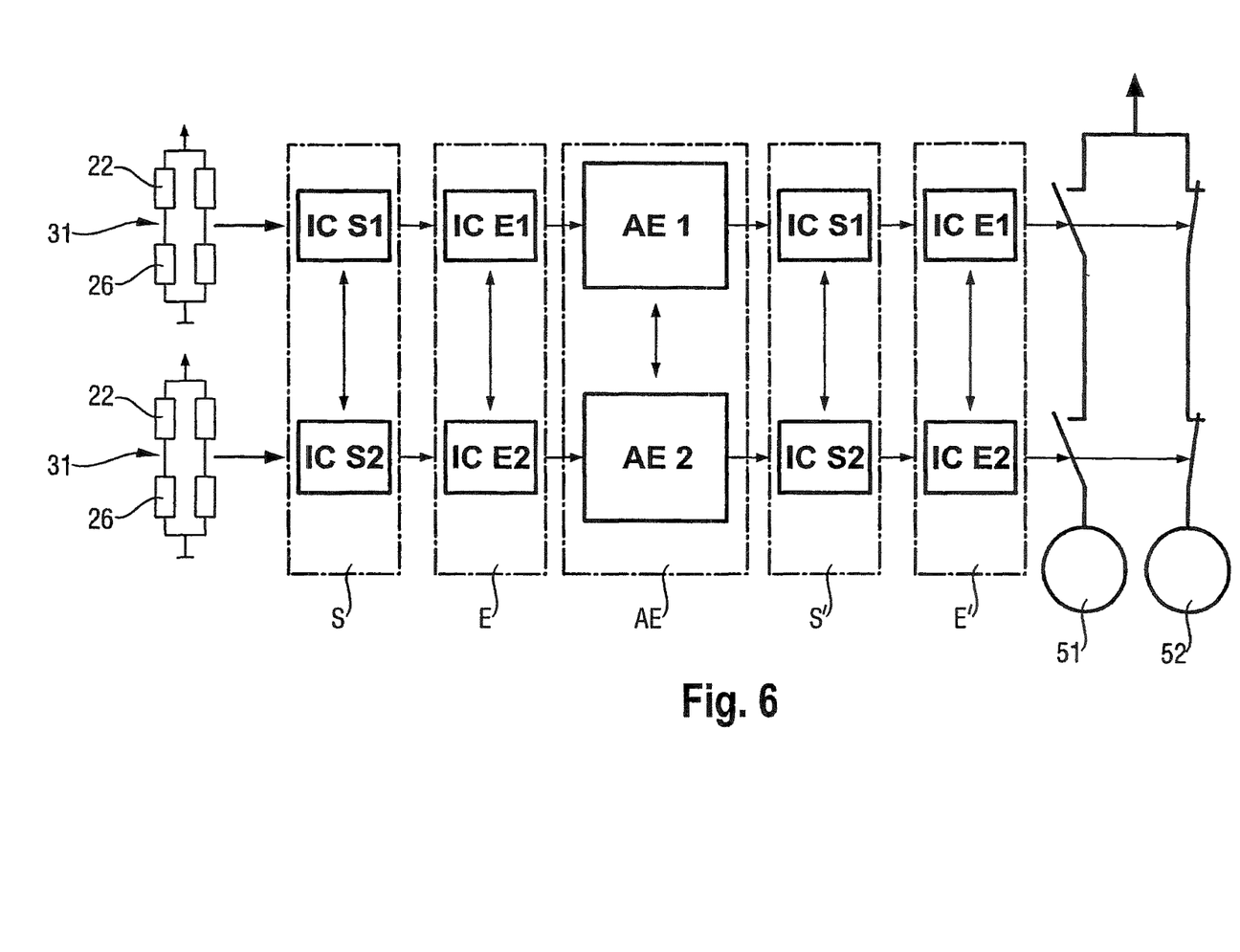
FIG. 6 a block diagram of the torque monitoring system provided according to the invention.

FIG. 6 shows, in addition to the two sensors 31 in the form of full bridges having strain gauges 22, the part of the controller of a robot according to the invention that pertains to monitoring the torques.

Figure 7:
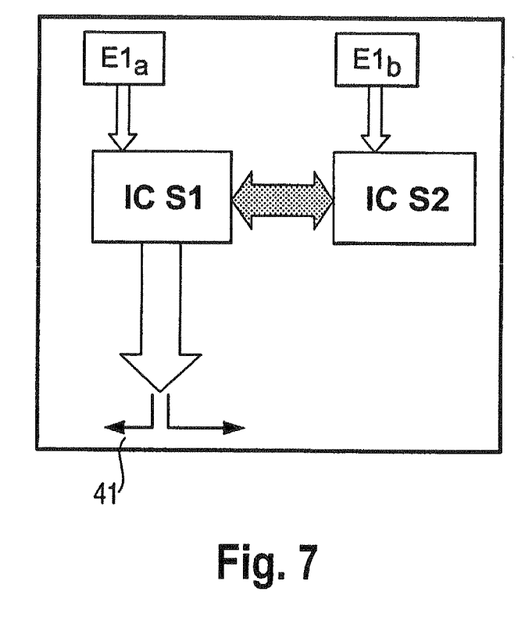
FIG. 7 a detailed block diagram of the transmitter unit of FIG. 6 for generating a reliable protocol for transmitting the measurement data.

The sensors 31 depicted in FIG. 6 are arranged on a gear set in such a way that they detect the same occurring torque. They are connected to two computing units S1, S2 in the form of integrated circuits (ICs), which have microcontrollers, within a transmitter unit S. A first check of the measured torque values takes place in transmitter unit S, as depicted in FIG. 7.

To increase the reliability, ICs S1, S2 are of diverse design, i.e., they have for example differing types of microcontrollers, whether from the same manufacturer or from different manufacturers, but not of the same type from one and the same series. This lessens the probability and hence the risk that both will make the same computing error in a calculation in the same situation due to their design.

The received input signals $E1_a$, $E1_b$ are routed to both ICs S1, S2, which first compare them to each other to see whether they are the same, or at least represent the same torque measurement. If that is the case, both ICs S1, S2 produce a reliable communication protocol with the input signals that represent the torque measurements, and provide it with a checksum.

The two ICs S1, S2 then compare the two protocols with each other. If these also agree, then at least one of the ICs sends the protocol via a transmission interface 41 to a receiving unit E of control unit 11 (FIG. 6). The reliability of the transmission is ensured by the simultaneous transmission of the test characteristic or checksum. A plurality of microcontrollers depicted individually in FIG. 6 may also be combined into one unit or integrated.

If a difference appears on one of the forenamed review steps, whether with regard to the input signals or with regard to the generated protocols, an error-handling routine is initiated by transmitting an error message, and in particular the sending of the protocol is halted, where the IC that is not itself transmitting, S1 in the depicted example, is able to stop the other IC S2 from sending the protocol. The protocol is transmitted to a receiving unit E. The IC E2 of receiving unit E which receives the protocol directly transfers the protocol as such to the other IC E1 of receiving unit E. Both ICs E1, E2 check the integrity of the protocols on the basis of the simultaneously conveyed test characteristic, and pass the torque measurements contained in the protocols to an evaluation unit AE, which has two sub-evaluation units AE1, AE2. These perform the evaluation of the obtained measurement results, pass them to each other, and compare the results with each other. They give a control signal to each of the processors S1', S2' of a transmitter unit S', which can be constructed in principle in the same way as that in FIG. 7, which performs checks and balances. Control commands are conveyed in the form of a protocol provided with a test characteristic, to a receiving unit E' with ICs E1', E2' assigned to brakes 51 and drives 52, which in turn also perform a comparison of the received signals and pass them to brakes 51 and drives 52.

Insofar as there is agreement in the individual units regarding the comparisons performed, the normal operation of the robot is carried out. If divergences arise, the robot is stopped to prevent damage.

Figure 8:
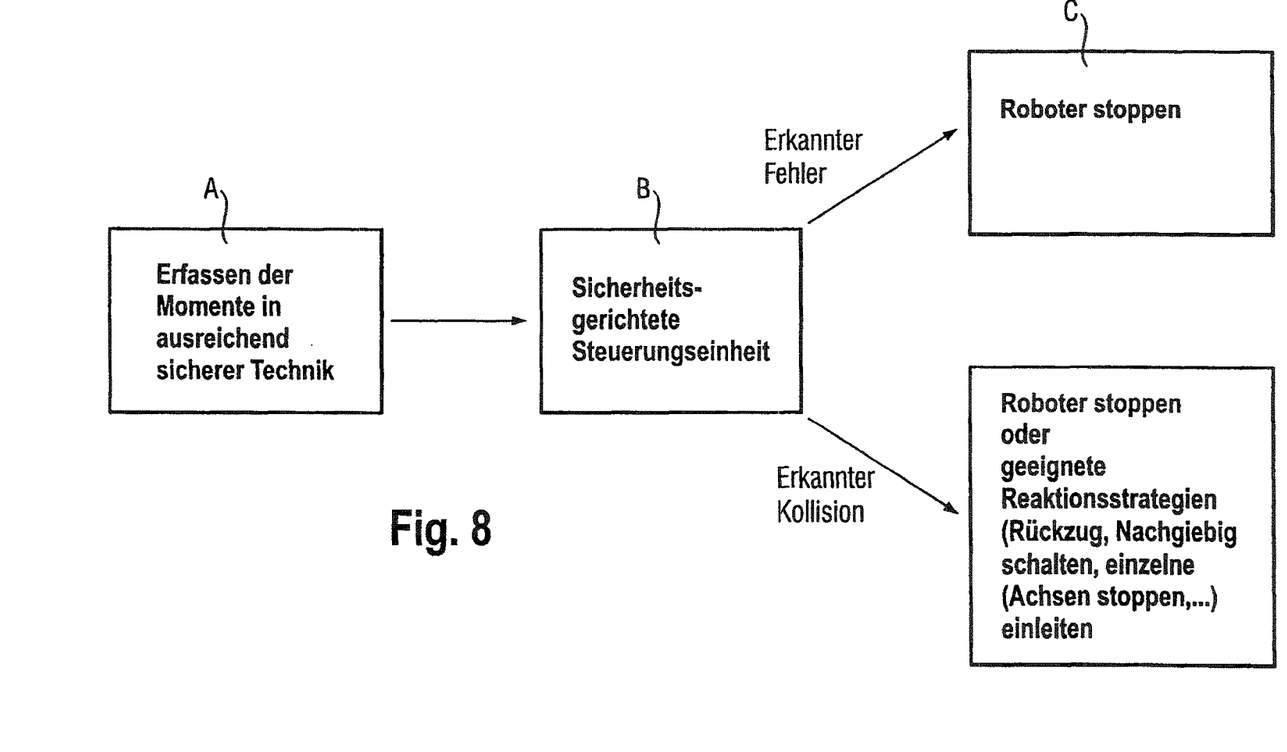
FIG. 8 a flow chart of the method of torque monitoring according to the invention.

The procedural sequence according to the invention is depicted once again in FIG. 8.

In step A, detection of the torques takes place in the described two-channel, preferably diverse manner, in particular by means of differing measuring principles and differing measuring circuits. In step B, a reliability-oriented control also takes place with two-channel, preferably diverse evaluation in which, as stated, physically different components (processors) of like parts from different series of the same manufacturer or from different manufacturers are employed. If an error is detected, the robot is stopped in step C.

If the processing of the measured torque values takes place correctly, but the latter assume to large or too small a value, which signifies a collision, then in step B an appropriate response strategy is introduced, which can consist in stopping the entire robot, individual axes, pulling the robot back or switching the axes flexibly.

Figure 9A:
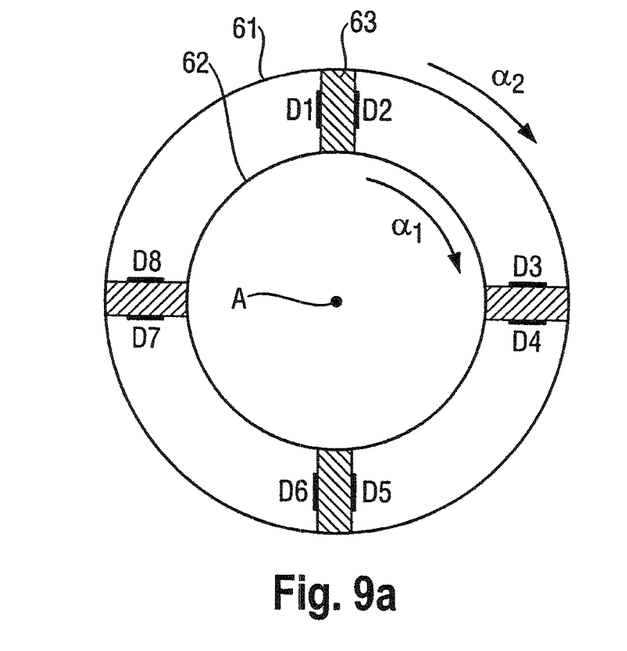
FIGS. 9a, b schematic depictions of the placement of strain gauges on links located between two rings, one of which carries the other along: without torque in FIG. 9a, with torque in FIG. 9b.
Figure 9B:
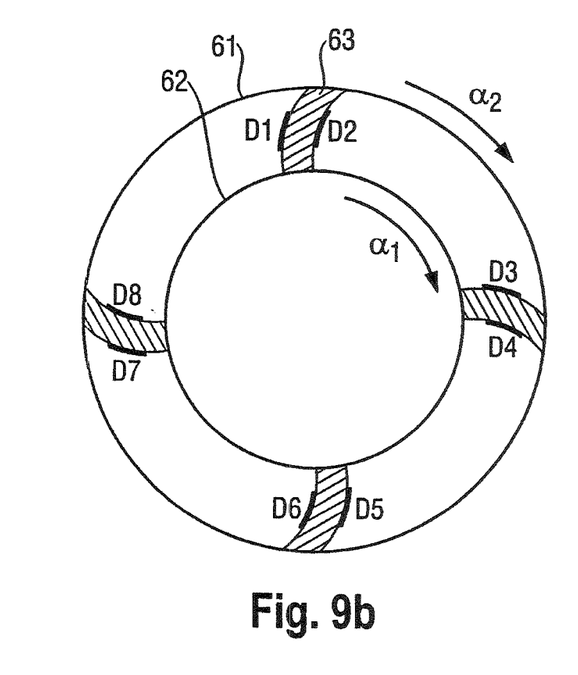

FIG. 9 shows two rings 61, 62, which are oriented radially as long as there is no influence from torque, and to which strain gauges D1, D2, D3, D4, D5, D6, D7, D8 are applied, opposite each other, on the front and rear sides of this link 63 in the direction of motion. In the illustration in FIG. 9a there is no torque acting. In the illustration in 9b the outer ring 61 is driven, and is carrying the inner ring 62 with it via the links 63, so that torques are acting.

Figure 10A:
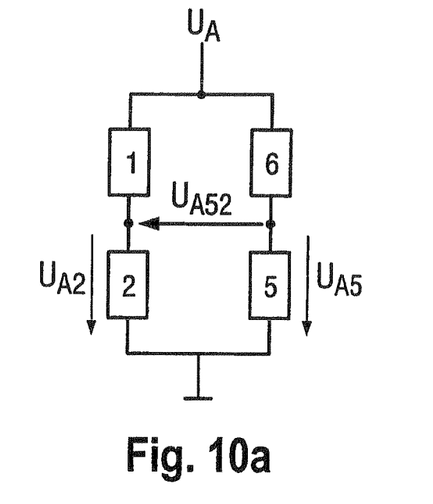
FIGS. 10a, b full measuring bridges for connecting the strain gauges of FIGS. 9a and 9b.
Figure 10B:
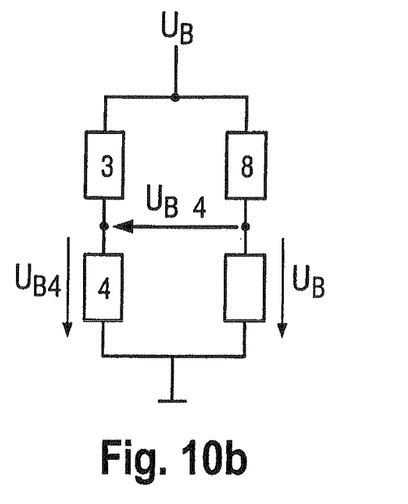

FIGS. 10a and 10b depict the interconnection of strain gauges D1, D2, D5, D6 on the one hand and D3, D4, D7, D8 on the other hand to form full bridges, at which voltages $U_A$ and $U_B$ respectively are present, which are known on the one hand as applied voltages and are thus also known to the evaluation unit, and on the other hand are chosen to be different, it being assumed below that the value of $U_B$ is greater than the value of $U_A$.

$$U_{A2}/U_A - U_{B4}/U_B = \pm E_1 \qquad (1)$$

$$U_{A5}/U_A - U_{B7}/U_B = \pm E_2 \qquad (2)$$

where $U_{B7} > U_{A5}$ and $U_{B4} > U_{A2}$. Then the following are true:

$$U_{A52} = U_{A5} - U_{A2} \qquad (3)$$

$$U_{A52} - U_{B74} = \pm E_3 \qquad (4)$$

It is not voltages that are compared here, but torques assigned to the voltages.

When the bridge circuit is balanced and no torque is acting, then $U_{A52} = 0$ and $U_{B74} = 0$. In that case $U_{A52}$ and $U_{B74}$ cannot be monitored.

Figure 11:
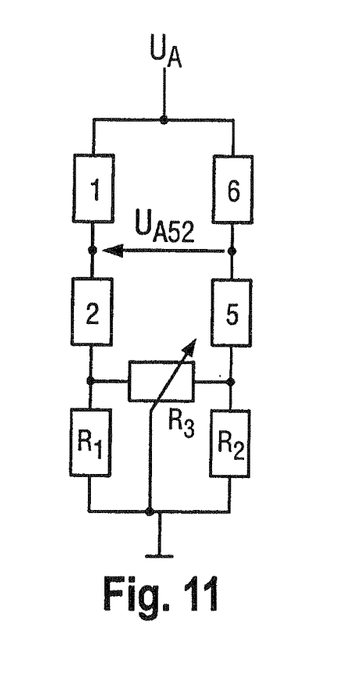
FIG. 11 a bridge circuit for establishing one of the measuring bridges of FIGS. 10a, 10b, in order to attain unequal transverse stresses in the case where there is no torque.

That can be remedied and monitoring enabled by intentionally unbalancing one bridge circuit, so that at maximum torque $U_{A52}$ and $U_{B74}$ cannot both be zero. For such tuning, in FIG. 11, which then replaces FIG. 10a, additional fixed resistors R1, R2 are placed in series with the strain gauges D2 and D5, and a potentiometer R3 is placed between the connections (parallel to $U_{A52}$) by means of which the unbalancing can be performed.

Alternatively, the strain gauges can also be applied with pre-stressed mechanics: strain gauges D1, D2, D5, D6 with the maximum positive torque and strain gauges D3, D4, D7, D8 with the maximum negative torque. Thus $U_{A52}$ and $U_{B74}$ have non-zero values when no torque is acting.

The measurement is carried out in particular in such a way that the applied voltages $U_A$ and $U_B$ are pulsed and a check for shorting is performed.

Reference Labels 1 multi-purpose manipulator
2 fixed base
3 carousel
4 upper arm
5 lower arm 6 robot hand
7 hand part
8 tool
9 motors
11 control unit
21 strain gauges
22 measuring resistor
23 substrate
24 cover
25 electrical connections
26 resistor
31 sensors
41 transmission interface
51 brakes
52 drives
61, 62 rings
63 links
A1 to A6 axes
AE1, AE2 evaluation unit
D1-D8 strain gauges
E receiving unit
E1, E2 ICs
E1', E2' controllers
$E1_a$, $E1_b$ input signals
R1, R2 fixed resistances
R3 potentiometer
S transmitter unit
S1, S2 ICs
S1', S2' processors

The invention claimed is:

1. An industrial robot, comprising:
   first and second components movable relative to each other around at least one joint, the first and second components selected from the group consisting of a carousel, a robot arm, and a robot hand;
   a first sensor circuit configured only on the first component and a second sensor circuit configured only on the second component, the first sensor circuit configured to detect a first force incident on the first component and the second sensor circuit configured to detect a second force incident on the second component; and
   a control unit having first and second evaluation units in communication with the first and second sensor circuits, respectively, the first evaluation unit configured to evaluate the first force and the second evaluation unit configured to evaluate the second force, wherein at least one of the first or second evaluation units is further configured to compare the first force to the second force for redundant evaluation of the first and second forces,
   wherein at least one of the first evaluation unit or the second evaluation unit has a comparison device configured to compare the first or second force to a corresponding modeled force, the modeled force being determined from a model of the industrial robot in a corresponding mode of operation to that in which the first and second forces were measured.

2. The industrial robot of claim 1, wherein at least one of the first sensor circuit or second sensor circuit includes a strain gauge.

3. The industrial robot of claim 1, wherein the first sensor circuit measures the first force according to a first measuring principle and the second sensor circuit measures the second force according to a second measuring principle different from the first measuring principle.

4. The industrial robot of claim 1, wherein the first sensor circuit is a first type of sensor and the second sensor circuit is a second type of sensor different from the first type of sensor.

5. The industrial robot of claim 1, wherein the first sensor circuit and the second sensor circuit are connected in a half-bridge configuration.

6. The industrial robot of claim 1, wherein the first sensor circuit and the second sensor circuit are connected in a full-bridge configuration.

7. The industrial robot of claim 1, further comprising:
   a monitoring device configured to monitor a supply voltage to at least one of the first sensor circuit or second sensor circuit.

8. The industrial robot of claim 1, at least one of the first evaluation unit or the second evaluation unit further comprising:
   a comparison device configured to compare a first and a second force value to each other.

9. The industrial robot of claim 1, further comprising:
   an interrupt device configured to shut off the industrial robot or cause the industrial robot to enter a safe state when at least one of the first or second evaluation units determines that the first force and the second force differ by more than a predetermined amount.

10. The industrial robot of claim 1, further comprising:
    a reference device configured to move at least a portion of the industrial robot to a reference position, the reference device further configured to confirm the operation of at least one of the first sensor circuit or second sensor circuit while the at least a portion of the industrial robot is in the reference position.

11. The industrial robot of claim 1, further comprising:
    a reference device configured to move at least a portion of the industrial robot to reference positions, the reference device further configured to confirm the operation of at least one of the first sensor circuit or second sensor circuit while the at least a portion of the industrial robot moves to the reference positions.

12. A method for monitoring, in an industrial robot, torque on a first component that moves relative to a second component via at least one joint, the first and second components selected from the group consisting of a carousel, a robot arm, and a robot hand, the method comprising:
    simultaneously detecting first and second forces incident on respective first and second components with respective first and second sensor circuits, wherein the first sensor circuit is only on the first component and the second sensor circuit is only on the second component;
    independently evaluating the first and second forces;
    comparing the first force to the second force for redundant evaluation of the first and second forces;
    determining a modeled force from a model of the industrial robot in a corresponding mode of operation to that in which the first and second forces were measured; and
    comparing the first or second force to the corresponding modeled force.

13. The method of claim 12, wherein at least one of the first sensor circuit or second sensor circuit includes a strain gauge.

14. The method of claim 12, wherein the first sensor circuit measures the first force according to a first measuring principle and the second sensor circuit measures the second force according to a second measuring principle different than the first measuring principle.

15. The method of claim 12, wherein the first sensor circuit is a first type of sensor and the second sensor circuit is a second type of sensor different than the first type of sensor.

16. The method of claim 12, wherein the first sensor circuit and the second sensor circuit are connected in a half-bridge configuration.

17. The method of claim 12, wherein the first sensor circuit and the second sensor circuit are connected in a full-bridge configuration.

18. The method of claim 12, further comprising:
monitoring a supply voltage to at least one of the first sensor circuit or second sensor circuit.

19. The method of claim 12, further comprising:
shutting down the industrial robot in response to determining that the first force and the second force differ by more than a predetermined amount.

20. The method of claim 12, further comprising:
moving at least a portion of the industrial robot to a predetermined position; and
confirming the operation of the at least one of the first sensor circuit or second sensor circuit while the at least a portion of the industrial robot is in the reference position.

21. The method of claim 12, further comprising:
moving at least a portion of the industrial robot along a predetermined path; and
confirming the operation of at least one of the first or second sensor circuit while the at least a portion of the industrial robot moves along the predetermined path.

22. The method of claim 12, further comprising:
processing at least one of the first or second forces with a computing unit that includes at least one of a microprocessor, microcontroller, digital signal processor, or field programmable gate array; and
simultaneously transmitting the first and second values to the computing unit via respective communication paths.

23. The method of claim 22, wherein simultaneously transmitting the first and second values to the computing unit comprises transmitting via at least one secure communication protocol.

* * * * *